United States Patent [19]

Justice

[11] 4,408,151
[45] Oct. 4, 1983

[54] ELECTRIC POWER APPARATUS

[76] Inventor: Donald S. Justice, 1816 N. Queens La., Arlington, Va. 22201

[21] Appl. No.: 842,235

[22] Filed: Oct. 14, 1977

[51] Int. Cl.$^2$ .......................................... H01M 10/46
[52] U.S. Cl. ........................................... 320/2; 320/61
[58] Field of Search .................. 320/14, 61, 2; 322/1, 322/4, 100; 323/92; 310/11; 336/182

[56] References Cited

U.S. PATENT DOCUMENTS 2,485,666 10/1949 Silver .................................. 336/182
2,555,630 6/1951 Bishner ............................. 320/14 X
3,827,912 8/1974 Justice ............................. 310/11 X Primary Examiner—Robert J. Hickey

[57] ABSTRACT

A coiled tubular electric battery is a conductor through its electrolyte and it may coincide with an electromagnet and a wire coil. The electromagnet is powered by the battery and caused to pulsate whereby its fluctuating magnet is equivalent to relative motion between the coils and the magnet. Current is increased by ampere turns in the wire induction coil while voltage is increased by series connection of the battery cells.

1 Claim, 4 Drawing Figures

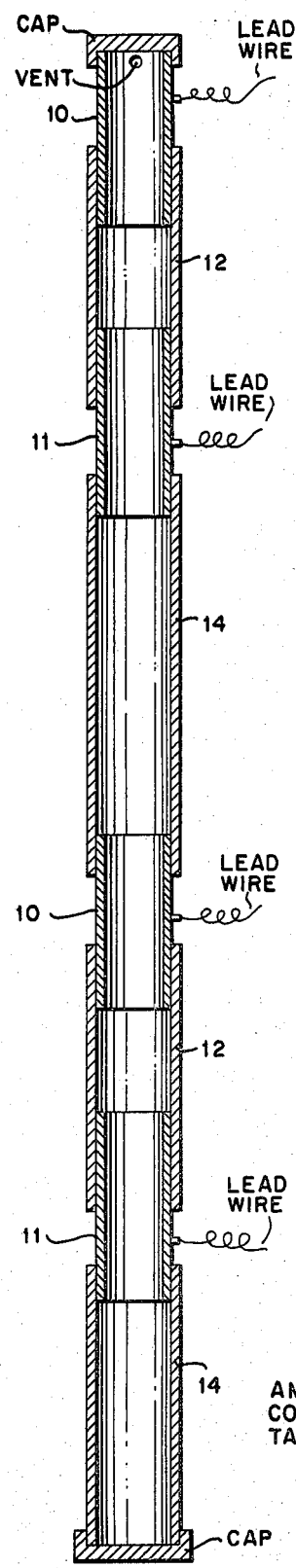
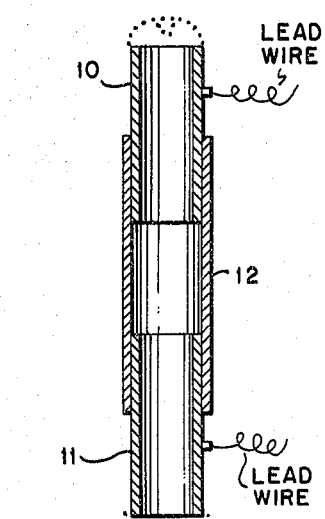
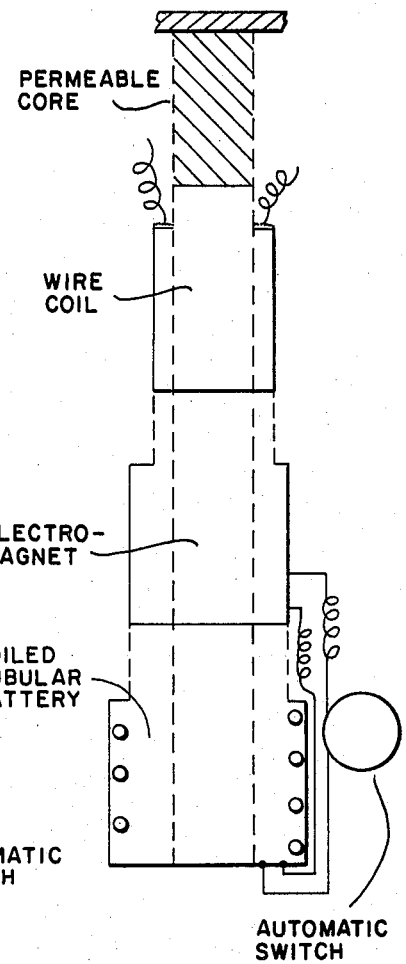
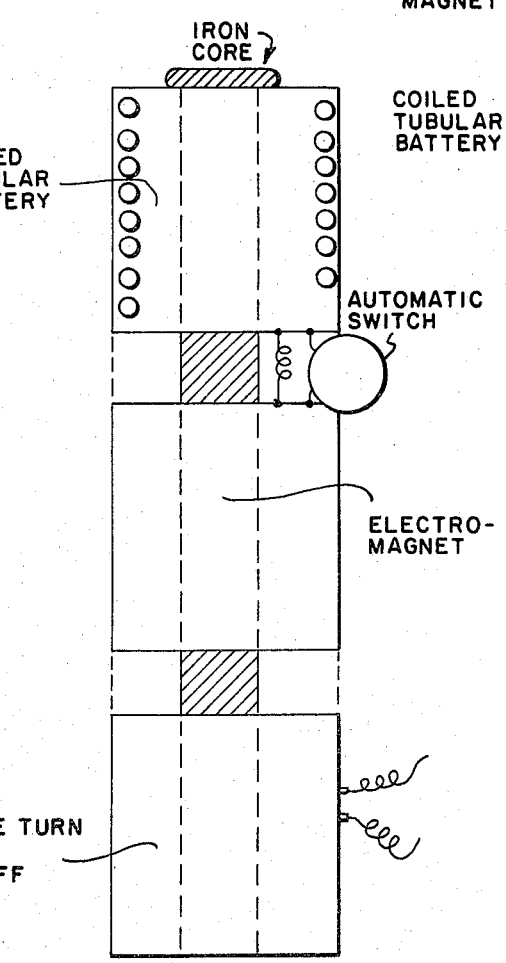

ELECTRIC POWER APPARATUS

This invention relates to electric cells of hollow tubular materials suitable as anodes, cathodes, and insulation and particularly when a number of such cells are joined by tubular insulation and filled with electrolyte making an electric battery in the form of a composite straight tube or a composite helical tube. Considering that electrolyte in the tube is a conductor, the flow of an electric current through the battery connections presents an intrinsic situation in the helix so as to concentrate or assemble magnetic forces. It is noted here that such a battery can be configured to coincide with a wire coil and in general have the shape and form of a coil or electromagnet, share a common axis iron core and indeed occupy the same space as the magnetic field of the electromagnet. The electromagnetic is powered by the battery and caused to pulsate whereby its fluctuating magnet is equivalent to relative motion between the coils and magnet. While no restriction as to use is contemplated, the principal use of the invention is for furnishing electricity to power an electric automobile, but more particularly to furnish a many faceted educational basis in experimenting with producing electricity for any fitting use or application. When the electrically conductive fluid in the conduit battery is dilute sulfuric acid and the anodes and cathodes are formed by applying special lead-oxide pastes to a grid made of lead-antimony alloy a so called storage battery is at hand and it may be recharged.

A battery so constituted can have electric leads or connectors at the exterior of the anodes and cathodes for electric communication. The cells can be connected in the well known manner wherein "cells connected in series provide a higher voltage, while cells connected in parallel provide a higher current capacity" and "a combination series-parallel network of cells must be interconnected" when both voltage and current increase is needed. "In a series hookup, the negative electrode of the first cell is connected to the positive electrode of the second cell, the negative electrode of the second cell to the positive of the third, and so on. The positive electrode of the first cell and the negative electrode of the last cell then serve as the power takeoff terminals of the battery."

"In Parallel connection, all positive cell electrodes are connected to one line, and all negative electrodes are connected to the other." When this battery is connected to a load a circuit is complete and such circuit may be carried by a wire coil having a common axis with the tubular coil and connectors of the cells.

The foregoing quotes from Basic Electricity (Navy Training Course) are given here, along with the fact that electrolyte in the coiled battery is a conductor, to make plain that the battery per se qualifies as a conductor in the sense that the equivalent of relative motion between a magnet and a conductor has been utilized in this invention. A number of these composite tubular batteries may be connected in series and parallel as it was stated for cell connections within a battery.

The nature of the materials to make the tubular battery is unrestricted. Sponge lead anodes and cathodes may use diluted sulfuric acid as electrolyte to make a rechargable battery or the so called storage battery for example.

The figures of the invention may be understood by referring to the drawing in which:

FIG. 1 shows an illustrative detail of the cell.
FIG. 2 shows combination of FIG. 1, and
FIG. 3A shows a nesting of components so that each fits within another with an automatic electric switch in the combination, and
FIG. 3B shows 3 cylinders fit vertically on a common permeable core and with an automatic switch.

In FIG. 1 of the drawing reference character 10 designates a tubular anode having a wire lead which may be connected for electric communication. Reference character 11 designates a tubular shaped cathode which is likewise equipped for electrical communication. These two terminal tubes are joined by tubular insulating material in a manner to have continuity of the conduit and thus form a hollow composite tube which, with electrolyte therein, is an electric cell. The tubular insulating portion 12 may fit between and over the ends of the anode and cathode so as to leave a space between them and also form a seal against leaks in the composite tube. Cathode and anode shown as 10 and 11 on the drawings may be bimetalic or they may be sponge lead or the "pasted plate" material for recharging.

Specifically referring to FIG. 2, the designated 10, 11 and 12 composite cells are joined together by a section of insulation tube 14 to form a tubular battery. A composite tubular battery is subject to the well known manner of being connected electrically such as series, parallel, and series-parallel. The tubular insulation sections 14 and 12 are of any suitable material such as glass, plastic, or rubber and may be joined by molding, cementing, or otherwise. The ends of the battery may be plugged, capped, crimped or otherwise sealed except for a small vent.

FIG. 3A shows an arrangement for the saving of space. The labeled components are telescoped on a short common core of permeable material. The space allowed for coiled wire of each component is limited and the coiled battery is most remote from the core. The considerable saving in space may be warranted in such capsules as outer space vehicles.

FIG. 3B illustrates a preferred embodiment of the invention. As shown the coiled tubular battery, the electromagnet, and the ampere turn wire coil have equal intimacy with the iron core. Each of these components has similar space for turns in the coil except for the larger diameter in section as the tubular battery may have. Note that the tubular battery in one layer only would have space between it and the core for its own wire coil. Where these components are stacked as shown they may be in a cylinder or cup of plastic or other suitable material. In this configuration there is easy access to the tubular battery to exchange for a new one or for recharging the same battery. It is of advantage in conservation that all other components are relatively permanent. In FIG. 3A and FIG. 3B the electrical connections are the same and the automatic electric switch may be on top of the core. The tubular battery is connected to the electromagnet for electric communication and thus the electromagnet is the electric load of the battery. In this circuit there is a heat actuated switch of bimetalic operation or an otherwise operated automatic switch to pulsate the electricity and thus keep the strength of the electromagnet in constant fluctuation. The communication between the magnet and takeoff coil is by proximity induction. The coil is within the magnetic field and such field strength is increased by the common iron core or core of other permeable material. The function of the iron core to greatly increase the effectiveness of a coil or magnetic transfer is a well known fact. This invention brings the electric battery itself into enhancing the multiplicity of intercepting lines of magnetic force.

The nature of the electrolyte may vary and also the nature of the materials used for anode and cathode may vary. When sections 10 and 11, as shown on the drawings, are taken from the electromotive force series of metals the various considerations in practicality may be the guide. For example, in a short life anticipation for a cell, a copper anode and an aluminum cathode may serve with ammonium chloride solution as an electrolyte. The extreme corrosive effects will soon impair the operation. That is, a metal section may be consumed even as a gas is spent in a fuel cell. These tubular materials are available and inexpensive in lieu of an exhaustable fuel. Quarter inch copper and aluminum tubes are common and may be cut to desired length. A wide range of experiments can be performed quickly with this invention. The saving in space, the change in the shape of space requirements, the saving in weight, time, money and manufacturing expedience make this invention practical for use determinations in a range from the mobile electric car to the power house.

According to a feature of the invention different arrangements may be made for the automatic electric switch to bring the same effect as relative motion between a conductor and a magnet. It is a well known fact that fluctuating the amount of electricity in operating an electromagnetic will fluctuate the magnetic field of the electromagnet, which amounts to the same thing as physical movement of the conductor or the magnet. Consequently a moving rheostat, off and on switch, an auto flasher, or the like, may be used instead of the alternating liquid-gas flow switch of my prior application.

This invention brings novel additions to two of the factors affecting the strength or intensity of an electromagnetic field. First: the number of turns in the wire coil conductor must count also the turns in the battery itself since the electrolyte is a conductor. Second: the ratio of the coils length to its width must take into account the length and width of the battery which is also around the core in turns. It is to be noted in this regard that the great number of interceptions in the lines of magnetic force is higher due to the greater sectional diameter of the electrolyte in the tube and the still greater sectional diameter of the conductive walls of the anode and cathodes in the coiled battery.

The coiled battery furnishes the voltage in the two major dimensions in the quality of the electrical communication. The other major dimension in the quality is the amperage as it comes from the interception of the lines of magnetic force in ampere turns. The potential for the expansion of voltage is different from the expansion potential of amperage as current available for induction in this invention.

In ordinary batteries the voltage and the amperage are increased by series and parallel connections of the cells as heretofore described. In this invention the voltage is increased by series connections of the cells within the battery, but the amperage increase comes from the much more powerful source the simulated moving magnet or a stong magnet in the equivalent of movement. Persons skilled in the art are familiar with the phrase "relative motion between a magnet and a conductor" and they know that the modern electric generator is the widely used practical application of such coil and magnet relationship. It is now common knowledge that pulsating the strength of an electromagnet is the equivalent of constantly moving the magnet up to and away from a coiled wire conductor to generate a current of electricity in the coil. It is also widely recognized that pulsating the electricity operating an electromagnet will pulsate the strength of the attending magnetic field commensurately. Furthermore it is a well known fact that such strength pulsation in the electricity and its caused magnet amounts to the same thing as moving the magnetic field up to and away from a wire coil unceasingly, to generate a flow of electricity in the wire coil. This is what is meant by the equivalent of motion as used in this application.

To cause the pulsation in electric current entering the electromagnet to fluctuate or vary the strength of the magnet a rheostat may be used, but this requires physical motion for variance. Any fast acting on and off switch may be used, but the best result experiments used bimetalic heat actuated on and off switch such as the automobile turn signal flasher. The exact timing of the "off" period, in the automatic switch, and the exact time of the "on" period are matters of ultimate efficiency.

As stated, the materials for this invention are unrestricted and consequently sponge lead and lead peroxide with sulfuric acid mixed with water as the electrolyte may be used. Nickel-Cadmium and Silver-Zinc and other pairs may be used for the anode and cathode with diluted sulfuric acid as the electrolyte. That is, this battery may be a rechargable battery or the so called "storage battery". Recharging may be done as it is done for the battery of the automobile by reversing the positive and negative electrical flow back through the anode and cathode. However the rechargability of the coiled battery may be enhanced by intercepting lines of magnetic force. This invention meets the physical requirements due to the battery itself being a conductive coil adjacent an electromagnet with a common permeable core. The battery, as described, located adjacent a fluctuating electromagnet will alert those skilled in the art to the necessity for rechargeability which is reversal of current flow and the fact that a characteristic of induction coil current is a reversal of current flow direction. In the "off" period of the automatic switch the magnetic force is in decay or decline and the battery is receiving instead of outflowing current.

Persons skilled in the art will recognize other possibilities advantageous to this invention. For example, in FIG. 3B of the drawing a second tubular battery could be on the bottom of the stack and share an extended common core. This would require a consideration for the direction of winding, as it does for all coils, indicated by the established art. Different connections and effects would be noticed, but the most obvious would be a connection in series with the first battery to double the voltage. Since the main object and spirit of this invention is to furnish an implement of wide experimental inducement the following claims will recite the essence.

I claim:

1. Electric power apparatus comprising the combination of a coiled tubular battery, an automatic switch, an electromagnet having a coil and a permeable core, and a secondary coil in common with the core, wherein the battery output is connected through the automatic switch to the electromagnet and wherein the components are nested around the core whereby the unit ratio of the output to space is augmented.

* * * * *